United States Patent Office 3,687,875
Patented Aug. 29, 1972

3,687,875
POLYURETHANE FOAMS STABILIZED WITH 5-HYDROXY COUMARANS
Roland Nast, Cologne-Buchheim, Manfred Dahm and Kurt Ley, Leverkusen, and Rudiger Schubart, Cologne-Ehrenfeld, Germany, assignors to Farbenfabriken Bayer Aktiengesellschaft, Leverkusen, Germany
No Drawing. Filed Sept. 4, 1970, Ser. No. 69,943
Claims priority, application Germany, Sept. 9, 1969,
P 19 45 475.2
Int. Cl. C08g 22/44, 51/58
U.S. Cl. 260—2.5 BB                        8 Claims

ABSTRACT OF THE DISCLOSURE

A process is provided for the production of polyurethane foams from polyisocyanates, organic compounds which contain at least two hydrogen atoms reactive with NCO groups, blowing agents, catalysts, substances which prevent discoloration in the core of the foam and, if desired, other additives, characterized in that the substances used for preventing discoloration in the core are 5-hydroxy-coumarans of the general formula:

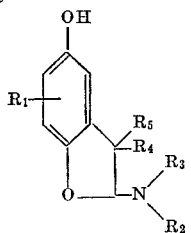

in which $R_1$ is a hydrogen atom or an alkyl radical, a cyclolakyl radical or an aralkyl radical containing one to nine carbon atoms, $R_1$ being in 6- or 7-position, $R_2$ and $R_3$ may be the same or different alkyl groups containing one to six carbon atoms or $R_2$ and $R_3$ taken together may form a 5-membered, 6-membered or 7-membered ring which, in addition to the nitrogen atom, may contain an oxygen or another nitrogen atom, $R_4$ and $R_5$ may be the same or different alkyl groups containing one to six carbon atoms or $R_4$ and $R_5$ taken together may form a carbocyclic 6-membered ring which may be sustituted with 1–5 alkyl groups with 1–4 C-atoms and which ring may contain a carbon to carbon double bond.

Foams with a very wide variety of physical properties have long been produced commercially using the isocyanate polyaddition process in which compounds containing several active hydrogen atoms, particularly hydroxyl and/or carboxyl groups, are reacted with polyisocyanates, if desired with the addition of water, activators, emulsifiers, foam stabilizers and other additives (see R. Vieweg, A. Hochtlen, Kunstoff-Hannbuch, volume VII, Polyurethane, Hanser Munchen, 1966). By choosing the appropriate reaction components, both elastic and rigid foams as well as intermediate type foams can thus be obtained.

Foams prepared from polyisocyanates are preferably produced by mixing liquid components. The compounds to be reacted with each other are either added together in a one-shot process or an NCO-containing prepolymer is first prepared by reacting a polyhydroxyl compound, such as a polyalkylene glycol ether or hydroxyl-containing polyester, with an excess of polyisocyanate, and the prepolymer is then converted into a foam with water or any other suitable blowing agent in a second reaction stage.

During the foaming process, unwanted discolorations occur in the block of the foam, particularly when producing foams having low bulk densities or when a comparatively large quantity of isocyanate is used, and a yellow to brown color is generally observed at the center of the clock of foam where the temperature increase due to the heat of reaction is highest. The discoloration of the foam is often made worse by the components of the reaction mixture including tertiary amines which are used as catalysts, amino-containing polyethers and various metal compounds which may be present as impurities, e.g. compounds of iron, copper, nickel or cobalt. Halogenated compounds such as those frequently used as blowing agents may also have a certain influence on the occurrence of such discolorations as may other additives including, for example, flame-proofing agents such as tris-β-chloroethylphosphate.

Attempts have been made to prevent the unwanted discoloration in the core of a foam by the addition of nitro-containing or nitroso-containing compounds of 2,6-di-tertiary butyl-p-cresol or, as described in German Auslegeschift 1,282,973, by the addition of phenothiazine.

The addition of nitro and/or nitroso compounds is disadvantageous, however, since these compounds are physiologically harmful. Moreover, these compounds, as well as phenothiazine, cause an undesirable yellow or pink discoloration of the foams. Furthermore, 2,6-di-tertiary butyl-p-cresol is only of very limited effectiveness.

It is therefore an object of this invention to provide improved polyurethane foams and a process for preparing them which are devoid of the foregoing disadvantages.

Another object of this invention is to provide polyurethane foams which are free from discolorations and a process for preparing them.

Another object of this invention is to provide polyurethane foams which are free from discoloration and have low bulk densities or are prepared from comparatively large quantities of isocyanate and a process for preparing them.

Yet another object of this invention is to provide polyurethane foams which are free from discoloration even when tertiary amines, amino polyethers, various metal compounds, halogenated compounds and other additives are included as components of the reaction mixture and a process for preparing them.

The foregoing objects and others which will become apparent from the following description are accomplished in accordance with this invention, generally speaking, by providing polyurethane foams which are free from discoloration and a method for producing them by reacting organic polyisocyanates, organic compounds containing at least two hydrogen atoms reactive with NCO groups, blowing agents and any desired catalysts or additives and including in the reaction mixture 5-hydroxy-coumaran derivatives having the general formula

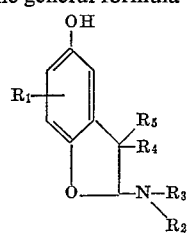

in which $R_1$ is a hydrogen atom or an alkyl radical, a cycloalkyl radical or an aralkyl radical, each of which contains from one to nine carbon atoms; $R_1$ being in 6- or 7-position of the heterocyclus, $R_2$ and $R_3$ are the same or different alkyl groups containing one to six carbon atoms or $R_2$ and $R_3$ taken together may form a 5-membered, 6-membered or 7-membered ring which in addition to the nitrogen atom may contain an oxygen or an additional nitrogen atom and $R_4$ and $R_5$ are the same or different alkyl groups containing one to six carbon atoms or $R_4$ and $R_5$ taken together may form a carboxylic 6-membered ring, which may be substituted by 1–5 alkyl groups with 1–4 carbon atoms and which ring may contain a carbon to carbon double bond.

It has now been found that undesirable discolorations which often occur in polyurethane foams can be prevented if the isocyanate polyaddition reaction is carried out in the presence of 5-hydroxy-coumarans or certain substitution products of 5-hydroxy-coumarans. The action of 5-hydroxy-coumarans is probably due to the fact that they prevent reactions with free radicals which presumably cause the discolorations in the interior of the blocks of foam. Since free radicals are particularly readily produced by treatment with oxygen, the effectiveness of the 5-hydroxy-coumarans can be checked by determining the time after which oxygen uptake takes place. At that point, the stabilizer has been used up and this length of time is a direct measure of the effectiveness of the substance.

The 5-hydroxy-coumarans are advantageously used in an amount of 0.001 to 5 percent by weight, preferably 0.02 to 3.0 percent by weight, based on the weight of the reaction mixture.

During the preparation of the foam product, the stabilizers of this invention may be incorporated into one of the reactants, e.g. the polyol or the organic polyisocyanate, or they may be added separately to the reaction mixture in the form of a highly concentrated solution in a suitable solvent. For technical reasons, it is especially advantageous in practice to incorporate the 5-hydroxy-coumarans directly with the polyol or the polyisocyanate after preparation. In order to prevent unwanted discoloration from occurring in the polyol in which the 5-hydroxy-coumaran is contained especially when the polyol is a polyether, it has been found that a synergistic effect is achieved when the 5-hydroxy-coumarans are used in combination with organic esters of phosphorous acid such as triphenyl phosphite, tributyl phosphite, tris-dipropylene glycol phosphite, tri-chloroethyl phosphite and the like or with esters of phosphines such as triphenyl phosphine and the like or with sulphides such as bis($\beta$-carbalkoxyethyl) sulphide and so on. In addition, it has been found that mixtures of 5-hydroxy-coumarans with the esters of phosphorous acid or with the phosphines or sulphides can prevent unwanted discolorations in polyols, especially in polyethers, which occasionally occur in the polyols when 5-hydroxy-coumarans are used alone. These esters of phosphorous acid, the phosphines or sulphides are used in an amount of 0.01 to 5 percent by weight, based on the weight of the reaction mixture, in addition to the 5-hydroxy-coumarans.

The 5-hydroxy-coumarans of this invention may be prepared by any suitable method including the reaction of benzoquinone or monoalkyl benzoquinones with enamines. The preparation of the compounds is described in U.S. Pat. 3,344,109.

Some suitable 5-hydroxy-coumarans which may be used in the process of this invention include, in particular, those corresponding to the above formula in which $R_2$ to $R_5$ have the meanings given there (e.g. alkyl groups with 1–6 carbon atoms) and $R_1$ represents a methyl, ethyl, isopropyl, tertiary butyl, tertiary amyl, tertiary octyl, isononyl, cyclopentyl, cyclohexyl, 1-methyl-cyclopentyl, 2-phenylethyl or a 2-methyl-2-phenylethyl group. Some particularly suitable compounds include 2-dimethylamino-3,3-dimethyl-5-hydroxy-coumaran,
2-diethylamino-3,3-dimethyl-5-hydroxy-coumaran,
2-pyrrolidino-3,3-dimethyl-5-hydroxy-coumaran,
2-piperidino-3,3-dimethyl-5-hydroxy-coumaran,
2-morpholino-3,3-dimethyl-5-hydroxy-coumaran,
2-pyrrolidino-3,3-dimethyl-6-tertiary butyl-5-hydroxy-coumaran,
2-morpholino-3,3-dimethyl-6-tertiary butyl-5-hydroxy-coumaran,
2-pyrrolidino-2,2-dimethyl-6-methyl-5-hydroxy-coumaran,
2-pyrrolidino-3,3(spiro-cyclohexen-(3)-yl)-5-hydroxy-coumaran,
2-morpholino-3,3(spiro-cyclohexyl)-5-hydroxy-coumaran,
2-piperidino-3,3(spiro-cyclohexen-(3)-yl)-5-hydroxy-coumaran,
2-morpholino-3,3(spiro-3- or -4-methyl-cyclohexen-(3)-yl)-5-hydroxy-coumaran and the like and mixtures thereof.

Any organic polyisocyanate may be used in the preparation of the polyurethane foams of this invention including, for example, hexamethylene diisocyanate, xylylene diisocyanates, phenylene diisocyanates, tolylene diisocyanates, chlorophenylene diisocyanates, diphenylmethane - 4,4' - diisocyanates, naphthalene - 1,5 - diisocyanate, triphenylmethane - 4,4',4'' - triisocyanate, xylylene-$\alpha,\alpha'$-diisothiocyanate, any of those listed in U.S. Pat. 3,350,362 and mixtures thereof and the like. Dimers and trimers of isocyanates and diisocyanates, biuret polyisocyanates, semicarbazide-, urea-, allophanate- or acylated biuret polyisocyanates prepared from the foregoing exemplary polyisocyanates as well as adducts which contain free NCO groups which are prepared by reacting an excess of an organic polyisocyanate such as those listed above with alcohols such as trimethylol propane, glycerol, hexane-1,2,6-triol, glycol, low molecular weight polyesters such as castor oil and any of those polyols listed in U.S. Pat. 3,201,372. Furthermore, the reaction products of the above isocyanates with acetals as described in German Pat. 1,072,385 and the isocyanates mentioned in German Pats. 1,022,789 and 1,027,394 and any mixtures of the above compounds are also suitable. 2,4- and 2,6-tolylene diisocyanate and any mixtures of these isomers and polyphenyl-polymethylene polyisocyanates obtained by aniline formaldehyde condensation followed by phosgenation are especially preferred.

Any organic compounds which contain at least two hydrogen atoms reactive with NCO groups may be used to prepare the foams of this invention including any of those mentioned in U.S. Pat. 3,201,372. Polyhydroxy polyethers and polyhydroxy polyesters are preferably used. Some suitable polyhydroxy polyethers include those having a molecular weight of from about 250 to about 5000. These compounds are preferably prepared by reacting alkylene oxides or alkylene oxide mixtures with suitable initiator molecules. Any desired alkylene oxides may be used and ethylene oxide, propylene oxide, 1,2-butylene oxide, 2,3-butylene oxide and 1,4-butylene oxide are preferably employed. Any preferably low molecular weight, desired compounds having at least two hydrogen atoms reactive with NCO groups are suitable for use as initiator molecules, e.g. water, ethylene glycol, propane-1,2-diol, propane-1,3-diol, glycerol, trimethylol propane, hexane-1,2,6-triol, pentaerythritol, sorbitol, cane sugar, polyhydroxy benzenes, polyhydroxy naphthalenes, polyhydroxy anthracenes, poly-(hydroxyaryl) alkanes and the like as well as any listed in U.S. Pat. 3,201,372. Low molecular weight compounds are preferably employed. Addition products of alkylene oxides with phenol resins which contain hydroxyl groups, e.g. novolaks and similar compounds, are also suitable. Primary diamines and polyamines such as ethylene diamine, 1,3-propylene diamine, 1,4-butylene diamine, diaminobenzenes, triaminobenzenes and secondary diamines and polyamines such as N,N'-dimethylethylene diamine, N,N'-dimethylpropylene diamine, N,N' - dimethyldiaminobenzene, N,N',N'' - trimethyltriaminobenzene and similar compounds including any listed in U.S. Pat. 3,201,372 may also be used as suitable initiator molecules for the reaction with alkylene oxides. The polyhydroxy polyethers may also be used in admixture with the monomeric organic initiator molecules.

Any suitable polyhydroxy polyesters can be used to prepare the foam of this invention and those having an hydroxyl equivalent weight of 100 to 3000 in which the hydroxyl equivalent weight is the quantity of polyester in grams which contains 1 mol of hydroxyl groups are preferred. The polyhydroxy polyesters are prepared by reacting polycarboxylic acids or their anhydrides with polyvalent hydroxyl compounds. Any suitable polycarboxylic acids may be used including, for example, oxalic acid, succinic acid, glutaric acid, adipic acid, pimelic acid, maleic acid, fumaric acid, phthalic acid, terephthalic acid, dimerized fatty acids and the like. Any suitable polyvalent polyhydroxyl compounds may be used including, for example, ethylene glycol, diethylene glycol, triethylene glycol, polyethylene glycols, propylene glycol, dipropylene glycol, polypropylene glycols, butane-1,4-diol, butene-(2)-diol-1,4, glycerol, trimethylol propane, pentaerythritol, castor oil, hydroquinone, 4,4'-dihydroxydiphenylmethane, 4,4'dihydroxydiphenylpropane and the like. In the preparation of the polyhydroxypolyesters, it is preferred to react dicarboxylic acids with divalent hydroxyl compounds. Tricarboxylic acids or polycarboxylic acids as well as higher functional polyhydroxyl compounds may also be used in the preparation of the polyhydroxy polyesters.

Any tertiary amine may be used to catalyze the polyaddition reaction including any of those listed in U.S. Pats. 2,948,928; 2,941,967; 2,948,691; 3,201,372 and the like. The quantity of tertiary amine which may be used generally varies between about 0.001 and 10 percent by weight, based on the quantity of the polyol employed and depends on the molecular weight and the structure of the polyol component, of the amine and the isocyanate. The tertiary amines may also contain active hydrogen atoms.

Typical tertiary amines which are practically unreactive with isocyanate groups include inter alia triethylamine, tributylamine, N-methylmorpholine, N-ethyl-morpholine, N-cocomorpholines, N,N,N',N'-tetramethylethylene diamine, 1,4-diaza-bicyclo-(2,2,2)-octane, N-methyl-N'-dimethylaminoethyl-piperazine, bis- [2 -(N,N - dimethylamino)-ethyl]ether, N,N-dimethylbenzylamine, bis-(N,N-diethylaminoethyl) - adipate, N,N - diethylbenzylamine, pentamethyl-diethylene triamine, N,N - dimethyl-cyclohexylamine, N,N,N',N'-tetramethyl-1,3-butane diamine, N,N-dimethyl-3-phenylethylamine, 1,2-dimethylimidazole, 2-methylimidazole, sila-amines which contain carbon-silicon bonds as described in German Pat. 1,229,290; 2,2,4-trimethyl-2-silamorpholine, 1,3-diethylaminomethyl-tetramethyl-disiloxane and the like and mixtures thereof.

Typical tertiary amines which contain hydrogen atoms reactive with isocyanate groups include, for example, triethanolamine, triisopropanolamine, N-methyl-diethanolamine, dimethyl-ethanolamine and their reaction products with alkylene oxides such as propylene oxide and/or ethylene oxide and the like and mixtures thereof.

Bases which contain nitrogen, such as tetraalkylammonium hydroxides, and alkalies, alkali metal phenolates or alkali metal alcoholates such as sodium methylate or hexahydrotriazines may also be used as catalysts instead of or in addition to the amines.

Organic metal compounds, especially organo-tin compounds may be used as additional catalysts to accelerate the isocyanate-polyol reaction, especially to accelerate the reaction between polyether polyols and isocyanate.

Tin compounds which are particularly important are the stannous acylates such as tin-II-octoate, tin-II-ethylhexoate, tin-II-versatate, tin-II-acetate, tin-II-laurate or the dialkyl tin salts of carboxylic acids such as dibutyl tin diacetate, dibutyl tin dilaurate, dibutyl tin maleate, dioctyl tin diacetate and the like.

Water or liquified halogenated carbon compounds are used as blowing agents either alone or in combination with one another. Liquified halogenated carbon compounds include saturated, aliphatic hydrocarbons which are at least partly halogenated and which evaporate at or below the temperature used for foam formation. Preferred compounds are methylene chloride, chloroform, trichlorofluoromethane, dichlorodifluoromethane, and any of the blowing agents listed in U.S. Patent 3,201,372. Additives for regulating the pore size and cell structure and emulsifiers may also be used although they are not always necessary. In addition, fillers, dyes and plasticizers may be used in the production of the foam.

The polyurethane foams of this invention can be produced by any of the known one-stage, semi-prepolymer or prepolymer processes either at room temperature or at an elevated temperature. It is sometimes advantageous to use a mechanical apparatus for this purpose and any suitable apparatus as described e.g. in French Patent 2,074,713 or U.S. Reissue 24,514 may be employed.

The foam resins produced via the process of the invention are suitable for any purposes for which polyurethane foams have previously been used, e.g. for the production of upholstery, as heat insulation, sound insulation, textile coating, packaging, in the production of structural elements and so on.

The invention is further illustrated but is not intended to be limited by the following examples in which all parts and percentages are by weight unless otherwise specified.

EXAMPLES

Retardation of oxidation

About 0.1 part of compounds A to J in the table below are dissolved in about 100 parts of a linear polypropylene glycol having an hydroxyl number of 112 and the oxygen uptake is measured at about 130° C. The induction times obtained are shown in the table. The same polyether without the stabilizer of this invention has an induction time of one minute at the same temperature. The induction time is the time during which the substrate is protected against attack by oxidation; uptake of oxygen takes place only at the end of this time. The length of the induction time thus indicates the effectiveness of a particular stabilizer against oxidation. The induction time is determined manometrically in a Warburg apparatus.

TABLE I

| Compound: | Induction time in minutes (oxygen, 130° C.) |
|---|---|
| A | 124 |
| B | 103 |
| C | >345 |
| D | 128 |
| E | 196 |
| F | 267 |
| G | 87 |
| H | >360 |
| I | 112 |
| J | >360 |

Compounds A to J have the following formulae.

Compound A
(colorless, M.P. 163–164° C.)

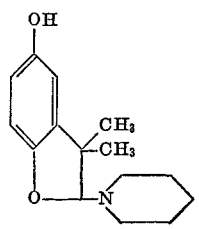

Compound B
(colorless, M.P. 147–148° C.)

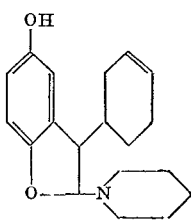

Compound C
(colorless, M.P. 172–175° C.)

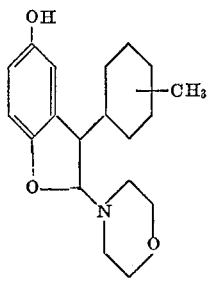

Compound D
(colorless, M.P. 124–125° C.)

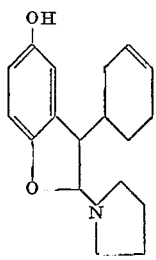

Compound E
(colorless, M.P. 155° C.)

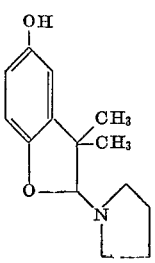

Compound G
(colorless, M.P. 187–188° C.)

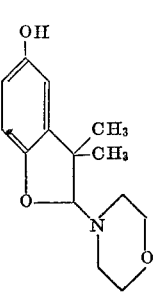

Compound I
(colorless, M.P. 154–155° C.)

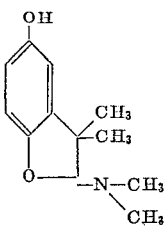

Compound J
(colorless, viscous oil)

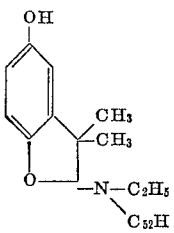

M.P.=melting point

The synergistic increase in the protection against oxidation which 5-hydroxy-coumarans acquire by a combination with triphenyl phosphite or triphenyl phosphine is demonstrated by the following experiments:

The compounds or mixtures of compounds shown in the following table are dissolved in about 100 parts of a linear polypropylene glycol having an hydroxyl number of 112 (molecular weight 1000) and the oxygen uptake is determined at about 150° C. Compounds C, F and H are as described for Table I. The induction times given in the table are obtained.

TABLE II

| Additive | Induction time in minutes (oxygen, 150° C.) |
|---|---|
| None | 1 |
| 0.5% of triphenyl phosphite | 1 |
| 0.5% of triphenyl phosphine | 2 |
| 0.1% of compound C | 42 |
| 0.1% of compound C+0.5% of triphenyl phosphite | 95 |
| 0.1% of compound C+0.5% of triphenyl phosphine | 170 |
| 0.1% of compound F | 33 |
| 0.1% of compound F+0.5% of triphenyl phosphite | 140 |
| 0.1% of compound F+0.5% of triphenyl phosphine | 246 |
| 0.1% of compound H | 88 |
| 0.1% of compound H+0.5% of triphenyl phosphite | 119 |
| 0.1% of compound H+0.5% of triphenyl phosphine | 139 |

Prevention of discoloration

The compounds or mixtures of compounds shown in the following table are dissolved in about 100 parts of a linear polypropylene glycol having an hydroxyl number of 112 (molecular weight 1000) and air at a temperature of about 130° C. is passed through the solution for about 6 hours. The color of the polyether is shown in Table III.

TABLE III

| Additive | Color of the polyether |
|---|---|
| 0.1% of compound A | Yellow |
| 0.1% of compound A+0.5% of triphenyl phosphite | Colorless |
| 0.1% of compound A+0.5% of triphenyl phosphine | Do. |
| 0.1% of compound B | Yellow-green |
| 0.1% of compound B+0.5% of triphenyl phosphite | Colorless |
| 0.1% of compound B+0.5% of triphenyl phosphine | Do. |
| 0.1% of compound C | Brown |
| 0.1% of compound C+0.5% of triphenyl phosphite | Colorless |
| 0.1% of compound C+0.2% of triphenyl phosphine | Do. |
| 0.1% of compound F | Brown |
| 0.1% of compound F+0.5% of triphenyl phosphite | Colorless |
| 0.1% of compound F+0.3% of triphenyl phosphine | Do. |
| 0.1% of compound H | Brown |
| 0.1% of compound H+0.5% of triphenyl phosphite | Colorless |
| 0.1% of compound H+0.1% of triphenyl phosphine | Do. |

Preparation of polyurethane foams (1) About 100 parts of a branched polyether based on glycerol and propylene oxide and ethylene oxide and containing 63 percent of terminal primary hydroxyl groups (hydroxyl number 32 are reacted with about 4 parts of water, about 0.2 part of triethylene diamine, about 1 part of a water-soluble polyether polysiloxane, about 0.1 part of tin-II-octoate and about 45 parts of tolylene diisocyanate (65 percent of 2,4- and 35 percent of 2,6-isomer) to produce a soft polyurethane foam which has good physical properties but a brown discoloration in the interior. After adding the following compounds as described for Table I in the given concentrations to the reaction mixture, similar soft polyurethane foams are obtained without the discoloration in the core using the same formulation.

| | Part |
|---|---|
| Compound A | 0.2 |
| Compound B | 0.15 |
| Compound C | 0.3 |
| Compound D | 0.1 |
| Compound E | 0.25 |
| Compound F | 0.35 |
| Compound G | 0.15 |
| Compound H | 0.35 |

When the same polyurethane foams are prepared using mixtures of 5-hydroxy-coumarans with triphenyl phosphite, the following synergistic results are obtained:

| Additive: | Discoloration in the core of the foam |
|---|---|
| 0.5 part of triphenyl phosphite | Brown |
| 0.2 part of compound C+0.5 part of triphenyl phosphite | None |
| 0.15 part of compound F+0.5 part of triphenyl phoshite | None |
| 0.15 part of compound H+0.5 part of triphenyl phoshite | None |

(2) About 100 parts of a slightly branched polyester obtained by condensing adipic acid with diethylene glycol and trimethylol propane (molecular weight 2500, hydroxyl number 60) are reacted with about 5 parts of water, about 0.8 part of dimethylbenzylamine, about 2 parts of sodium castor oil sulphate (50 percent water), about 1 part of oxyethylated benzyl-hydroxy-diphenyl and about 70 parts of tolylene diisocyanate (65 percent of 2,4- and 35 percent of 2,6-isomer) to produce a soft polyester polyurethane foam. The foam has good physical properties but a lemon yellow discoloration in the interior. After the addition of about 0.1 part of compound D, the same polyester-polyurethane foam is obtained except that it has no discoloration in the core.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. Polyurethane foams free from discoloration prepared by a process which comprises reacting organic polyisocyanates with organic compounds containing at least two hydrogen atoms reactive with NCO groups in the presence of a blowing agent and an effective amount of a 5-hydroxy-coumaran to prevent discoloration, the 5-hydroxy-coumaran having the formula

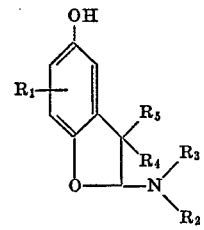

in which $R_1$ is hydrogen or an alkyl radical, a cycloalkyl radical or an aralkyl radical each containing from one to nine carbon atoms; $R_1$ being in 6- or 7-position of the heterocyclus; $R_1$ and $R_3$ are alkyl groups containing one to six carbon atoms or $R_2$ and $R_3$ together form a 5-, 6- or 7-membered ring and $R_4$ and $R_5$ are alkyl groups containing one to six carbon atoms or $R_4$ and $R_5$ form a carbocyclic 6-membered ring.

2. The polyurethane foam of claim 1 wherein $R_2$ and $R_3$ in the 5-hydroxy-coumaran forms a 5-, 6- or 7- membered ring which contains an oxygen or an additional nitrogen atom.

3. The polyurethane foam of claim 1 wherein $R_4$ and $R_5$ of the 5-hydroxy-coumaran forms a carbocyclic 6-membered ring substituted by 1–5 alkyl groups with 1–4 carbon atoms.

4. The polyurethane foam of claim 1 wherein $R_4$ and $R_5$ of the 5-hydroxy-coumaran forms a carbocyclic 6-membered ring which contains a carbon to carbon double bond.

5. The polyurethane foam of claim 1 wherein the 5-hydroxy-coumaran is present in an amount of 0.001 to 5 percent by weight based on the weight of the reaction mixture.

6. The polyurethane foam of claim 1 wherein the 5-hydroxy-coumaran is present in an amount of 0.02 to 3 percent by weight based on the weight of the reaction mixture.

7. The polyurethane foam of claim 1 wherein the 5-hydroxy-coumaran is
2-dimethylamino-3,3-dimethyl-5-hydroxy-coumaran,
2-diethylamino-3,3-dimethyl-5-hydroxy-coumaran,
2-pyrrolidino-3,3-dimethyl-5-hydroxy-coumaran,
2-piperidino-3,3-dimethyl-5-hydroxy-coumaran,
2-morpholino-3,3-dimethyl-5-hydroxy-coumaran,
2-pyrrolidino-3,3-dimethyl-6-tertiary butyl-5-hydroxy-coumaran,
2-morpholino-3,3-dimethyl-6-tertiary butyl-5-hydroxy-coumaran,
2-pyrrolidino-2,2-dimethyl-6-methyl-5-hydroxy-coumaran,
2-pyrrolidino-3,3(spiro-cyclohexen-(3)-yl)-5-hydroxy-coumaran,
2-morpholino-3,3(spiro-cyclohexyl)-5-hydroxy-coumaran, 2-piperidino-3,3(spiro-cyclohexen-(3)-yl)-5-hydroxy-coumaran,
2-morpholino-3,3(spiro-3- or
-4-methyl-cyclohexen-(3)-yl)-5-hydroxy-coumaran and mixtures thereof.

8. A process for preparing the polyurethane foam of claim 1 which comprises reacting organic polyisocyanates with organic compounds containing at least two hydrogen atoms reactive with NCO groups in the presence of a blowing agent and an effective amount of a 5-hydroxy-coumaran to prevent discoloration, the 5-hydroxy-coumaran having the formula

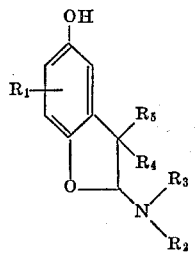

in which $R_1$ is hydrogen or an alkyl radical, a cycloalkyl radical or an aralkyl radical each containing from one to nine carbon atoms; $R_2$ and $R_3$ are alkyl groups containing one to six carbon atoms or $R_2$ and $R_3$ togther form a 5-, 6- or 7-membered ring and $R_4$ and $R_5$ are alkyl groups containing one to six carbon atoms or $R_4$ and $R_5$ form a carbocyclic 6-membered ring.

References Cited
UNITED STATES PATENTS

| | | | |
|---|---|---|---|
| 3,151,098 | 9/1964 | Watson et al. | 260—45.9 |
| 3,429,837 | 2/1969 | Langrish et al. | 260—2.5 |
| 3,148,163 | 9/1964 | Freyermuth | 260—2.5 |
| 3,177,228 | 4/1965 | Boehm et al. | 260—345.2 |

DONALD E. CZAJA, Primary Examiner

H. S. COCKERAM, Assistant Examiner

U.S. Cl. X.R.

260—45.8 A, 77.5 SS, 611.5